US009036612B2

(12) United States Patent
Gidlund et al.

(10) Patent No.: US 9,036,612 B2
(45) Date of Patent: May 19, 2015

(54) WIRELESS COMMUNICATION METHOD AND SYSTEM WITH COLLISION AVOIDANCE PROTOCOL

(71) Applicants: Mikael Gidlund, Sundsvall (SE); Dong Yang, Beijing (CN); Wei Shen, Sundsvall (SE); Youzhi Xu, Sollentuna (SE); Tingting Zhang, Sundsvall (SE)

(72) Inventors: Mikael Gidlund, Sundsvall (SE); Dong Yang, Beijing (CN); Wei Shen, Sundsvall (SE); Youzhi Xu, Sollentuna (SE); Tingting Zhang, Sundsvall (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/752,014

(22) Filed: Jan. 28, 2013

(65) Prior Publication Data

US 2013/0142180 A1 Jun. 6, 2013

Related U.S. Application Data

(63) Continuation of application No. PCT/EP2011/061562, filed on Jul. 8, 2011.

(30) Foreign Application Priority Data

Jul. 28, 2010 (EP) ..................................... 10171125

(51) Int. Cl.
  *H04J 3/00* (2006.01)
  *H04B 7/212* (2006.01)
  *H04J 3/16* (2006.01)
  *H04W 74/08* (2009.01)
  *H04W 84/18* (2009.01)

(52) U.S. Cl.
  CPC ........... *H04J 3/1694* (2013.01); *H04W 74/085* (2013.01); *H04W 84/18* (2013.01)

(58) Field of Classification Search
  CPC .......... H04W 74/0816; H04W 74/085; H04W 84/18; H04J 3/1694
  USPC ......................................................... 370/324
  See application file for complete search history.

(56) References Cited

U.S. PATENT DOCUMENTS 6,963,549 B1 * 11/2005 Jayaraman et al. ........... 370/328
8,094,617 B2 * 1/2012 Ki et al. ........................ 370/329

(Continued)

FOREIGN PATENT DOCUMENTS

WO 2008127688 A1 10/2008

OTHER PUBLICATIONS

Hwang, et al.; "A Virtual Slot Multiple Access for IEEE 802.15.3 High-Rate Wireless Personal Area Networks"; 2006 IEEE; 5 pages.

(Continued)

*Primary Examiner* — Jae Y Lee
(74) *Attorney, Agent, or Firm* — St. Onge Steward Johnston & Reens LLC

(57) ABSTRACT

A method for providing wireless communication between a source node and a destination node in a wireless network wherein the wireless network uses a time division multiple access (TDMA) protocol. One or more dedicated TDMA transaction timeslots are arranged in a superframe. The superframe includes at least one dedicated transaction slot forming a hybrid protocol with two or more shared transaction slots per superframe. The method is of particular advantage when practised with a WirelessHART protocol wireless sensor network and when used for monitoring and control equipment and processes in an industrial installation. A computer program, and a wireless node and a wireless network using the inventive method are also disclosed.

16 Claims, 4 Drawing Sheets

(56) References Cited

U.S. PATENT DOCUMENTS

| | | |
|---|---|---|
| 2008/0253328 A1 | 10/2008 | Sahinoglu et al. |
| 2008/0273518 A1 | 11/2008 | Pratt et al. |
| 2008/0316966 A1 | 12/2008 | Joshi et al. |
| 2009/0129353 A1 | 5/2009 | Ki et al. |
| 2009/0207747 A1 | 8/2009 | Kim et al. |
| 2010/0061362 A1 | 3/2010 | Wang et al. |

OTHER PUBLICATIONS

European Search Report Application No. PE 10 17 1125 Completed: Jan. 7, 2011; Mailing Date: Jan. 17, 2011 10 pages.

International Preliminary Report on Patentability Application No. PCT/EP2011/061562 Completed: Sep. 4, 2012 18 pages.

International Search Report and Written Opinion of the International Searching Authority Application No. PCT/EP2011/061562 Completed: Oct. 11, 2011; Mailing Date: Oct. 24, 2011 13 pages.

Nixon, et al.; "Meeting Control Performance over a Wireless Mesh Network"; 4th IEEE Conference on Automation Science and Engineering; Aug. 23-26, 2008; pp. 540-547.

Alur, et al.; "Modeling and Analysis of Multi-Hop Control Networks"; 15th IEEE Real-Time and Embedded Technology and Applications Symposium; 2009; pp. 223-232.

Biasi, et al.; "Simulation of Process Control with WirelessHART Networks Subject to Clock Drift"; Annual IEEE International Computer Software and Applications Conference; 2008; pp. 1355-1360.

Biasi, et al.; "Simulation of Process Control with WirelessHART Networks Subject to Packet Losses"; 4th IEEE Conference on Automation Science and Engineering; Aug. 23-26, 2008; pp. 548-553.

Kim, et al.; "When HART Goes Wireless: Understanding and Implementing the WirelessHART Standard"; 2008 IEEE; pp. 899-907.

Rhee, et al.; "Z-MAC: A Hybrid MAC for Wireless Sensor Networks"; IEEE/ACM Transactions on Networking, vol. 16, No. 3, Jun. 2008; pp. 511-524.

\* cited by examiner

WIRELESS COMMUNICATION METHOD AND SYSTEM WITH COLLISION AVOIDANCE PROTOCOL

FIELD OF THE INVENTION

The present invention is concerned with wireless communication in an environment with risk for conflicting wireless signals and/or interference. In particular it is concerned with a method and system for time slot allocation which comprises both dedicated time division multiple access transaction slots and shared transaction slots with mechanisms for conflict contention. It is of particular advantage when used in a wireless network for monitoring and control purposes in an industrial process control and automation context.

BACKGROUND OF THE INVENTION

Wireless technologies give several advantages to industrial automation in terms of gain in productivity and flexibility. Industrial sites are often harsh environments with stringent requirements on the type and quality of cabling. Moreover large sites often require many thousands of cables and it could be difficult to install or engineer additional wires in an already congested site. Thus wireless communication can save costs and time during an installation phase. Furthermore the ad-hoc nature of wireless networks allows for easy setup and re-configuration when the network grows in size.

A requirement of a wireless network is the coexistence of the wireless network with other equipment and competing wireless systems. The WirelessHART standard has been developed to fulfill these demands. WirelessHART is a wireless mesh network communication protocol for process automation applications, including process measurement, control, and asset management applications. It is based on the HART protocol, but it adds wireless capabilities to it enabling users to gain the benefits of wireless technology while maintaining compatibility with existing HART devices, tools and commands. A WirelessHART network may be connected to a plant automation network through a gateway. The plant automation network could be a TCP-based network, a remote I/O system, or a bus such as PROFIBUS. All network devices such as field devices and access points transmit and receive WirelessHART packets and perform the basic functions necessary to support network formation and maintenance. Communications among network devices are arbitrated using TDMA (Time Division Multiple Access) that allows scheduling of the communication link activity.

MAC protocols are the basis of wireless communication technologies, which are used to allocate shared wireless channel among communication nodes. In most cases, MAC protocols can be classified into two types: conflict-free protocols (FDMA, TDMA, CDMA, etc) and conflict-contention protocols (Slotted ALOHA, CSMA, Channel Hopping, etc). Some dominant wireless technologies and their MAC protocols may be briefly summarized as follows:

1. 2G cell phone system. The GSM (Global System for Mobile Communications) cellular system combines the use of FDMA (Frequency Division Multiple Access) and TDMA to allow multiple handsets to work in a single cell.
2. 2.5G cell phone system. GSM with the GPRS (General packet radio service) packet switched service uses a dynamic TDMA scheme for transferring the data.
3. 3G cell phone system. CDMA2000 uses CDMA (Code division multiple access) to send voice, data, and signaling data between mobile phones and cell sites.
4. Bluetooth. Bluetooth[1] packet mode communication uses Channel Hopping for shared channel access among several private area networks.
5. WLAN. IEEE 802.11[2] wireless local area networks uses CSMA/CA for multiple access within the cell.
6. IEEE 802.15.4. IEEE 802.15.4[3] uses TDMA for periodic traffic packets, and CSMA (Carrier Sense Multiple Access) for burst traffic packets.
7. WirelessHART. WirelessHART[4] combines the use of TDMA and Channel Hopping for periodic traffic packets, and Slotted ALOHA for burst traffic packets.

The above summary review shows that cell phone systems (2G, 2.5G and 3G) just use conflict-free MAC protocols; Bluetooth and WLAN use only conflict-contention MAC protocols. IEEE 802.15.4 and WirelessHART use all of conflict-free and conflict-contention MAC protocols, and different traffic kinds are distinguished in IEEE 802.15.4 and WirelessHART.

There are two kinds of traffic in industrial wireless applications: periodic traffic and burst traffic. Conflict-free MAC (multiple access) protocols, such as TDMA (Time Division Multiple Access), are more suitable for periodic traffic; on the other hand, conflict-contention MAC protocols, such as CSMA (Carrier Sense Multiple Access), are more suitable for burst traffic.

TDMA is a conflict-free MAC protocol, which divides the time axis into superframes. Every superframe is further divided into a lot of time slots and these slots are pre-assigned to different users exclusively. Every user is allowed to transmit freely during the slot assigned to it, that is, during the assigned slot the entire system resources are devoted to that user. TDMA is suitable for periodic traffic which is predictable to pre-assign. However, for the burst traffic packets, TDMA degenerates to function like an ineffective Slotted ALOHA protocol.

The basic idea of Slotted ALOHA is simple: let the wireless user transmit at the beginning of next slot whenever they have packets to be sent. Slotted ALOHA protocol has poor performance because whenever one sender has a packet to transmit it does so without consideration of others. CSMA is an improvement over Slotted ALOHA when it comes to transmitting burst packets. The philosophy of CSMA is that when a sender generates a new packet the channel is sensed and if found idle the packet is transmitted. When a collision takes place each sender reschedules a retransmission of the collided packet to some other time in the future randomly. However, traditional CSMA works in continuous time, which is not directly applied in pure TDMA systems.

IEEE 802.15.4 functions as it were a simple hybrid of TDMA and CSMA. Superframe time is divided into two time phases for TDMA and CSMA respectively, and in different phase, TDMA and CSMA are performed independently. Because CSMA can only be performed in continuous time, this simple hybrid is not used in a pure TDMA environment like WirelessHART. WirelessHART is a pure TDMA system and it distinguished from other, different traffic kinds. However, WirelessHART suffers from poor network performance because of the ineffective Slotted ALOHA-like functioning of its shared transaction slots.

In a patent application US 2009/0129353 entitled "Method for recognizing available channel in IEEE 802.15.4 protocol CSMA/CA mechanism", assigned to University Sungkyunkwan Foundation [KR], a method of recognizing an available channel in an IEEE 802.15.4 protocol CSMA/CA mechanism is described, in which a Random Backoff Time extension algorithm is used so as to improve performance of slotted CSMA/CA.

In another patent application US 2008/0316966 entitled "Optimizing positions of time slots in a hybrid time division multiple access (TDMA)-carrier sense multiple access (CSMA) medium access control (MAC) for multi-hop ad hoc networks"; assigned to Motorola Inc, a hybrid TDMA-CSMA MAC protocol is described for allocating time slots within a frame having a structure in which transmission time is divided into a first number of actual TDMA time slots and a second number of "virtual" CSMA time slots. Each frame comprises a variable length/duration TDMA portion and a variable length/duration CSMA portion, and the relative percentages of the frame which are allocated for the TDMA portion and the CSMA portion can be dynamically adjusted depending upon the traffic pattern.

SUMMARY OF THE INVENTION

The aim of the present invention is to remedy one or more of the above mentioned problems. This and other aims are obtained by a method for providing wireless communication.

According to a first aspect of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and wherein said superframe also comprises at least two or more shared transaction slots.

According to an embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and by setting a Backoff Exponent (BOExp) variable in the source node to a predetermined start number wherein at least a Backoff Counter (BOCntr) in the source node is zeroed.

According to another embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and by selecting one shared transaction slot between 1 and $2^{BOExp}-1$ and sending the delayed transmission during the selected shared slot.

According to another, further embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and by checking to see whether the Backoff counter in the source node is equal to zero (BOCntr=0) and, if so, then beginning to contend, or compete for, the shared transaction slot.

According to an embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and, upon non-receipt of an acknowledgement (ACK) within a predetermined time period, by re-transmitting the frame.

According to another embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and on detecting the channel is idle, then starting a preamble of a transmission at the end of the first backoff (CCA) slot or on detecting the channel is idle, by then sending a frame at the end of the superframe offset (TsTxOffset) period.

According to an embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and in that said superframe comprises at least one dedicated transaction slot and at least two shared transaction slots wherein the dedicated and shared slots are distributed alternately such that at least one shared transaction slot is not immediately followed by another shared transaction slot.

According to another embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and in that at least one shared transaction slot further comprises at least two backoff (CCA) slots.

According to an embodiment of the invention, a method is disclosed for providing wireless communication between a source node and a destination node in a wireless network, wherein said wireless sensor network uses a time division multiple access (TDMA) protocol and one or more dedicated TDMA timeslots are arranged in a superframe, and in that said wireless communication between a source node and a destination node comprises burst mode data transmissions.

One principle of the present teachings is a dual slots scheme, that is, a frame comprising both a dedicated time-allocated TDMA transaction slot and a CCA (Clear Channel Assessment) shared transaction slot. The dedicated transaction slot is used as in TDMA and slotted ALOHA, within which the whole transaction of a packet transmission is completed (including channel sense if necessary, data packet transmission and ACK transmission). The CCA slot is called a backoff period in CSMA (Carrier Sense Multiple Access), a backoff period being the maximum propagation delay time (the propagation delay time between the farthest two nodes in the wireless network) in theoretical analysis. (In practice, the propagation delay is longer because of hardware design.) Compared with a dedicated transaction slot, the CCA slot has a very short time duration.

According to the invention, the time axis may be firstly divided into transaction slots. These transaction slots are classified into two types: dedicated transaction slots and shared transaction slots. The difference between these two kinds of transaction slots is that dedicated transaction slots are used for periodic traffic packets, and shared transaction slots are primarily used for burst traffic packets. Dedicated transaction slots use TDMA protocol to pre-assign slots to wireless users exclusively hence each timeslot of a TDMA frame is dedicated to one wireless user. Shared transaction slots use a CSMA protocol to implement channel contention between wireless users, and CCA slots are used as backoff period as CSMA.

The number of CCA slots in a shared transaction slot is an important consideration in the invention, which is an important factor in deciding how much the performance is improved.

The proportion and distribution of these two kinds of transaction slots in the time axis may be another important aspect in the invention. The proportion is preferably based on the average error rate of the wireless network, which can be obtained from permanent observation and theoretical analysis. Preferably an alternate distribution of dedicated and shared slots is used in the invention, which greatly improves the performance of channel contention based on CSMA.

In this description examples are given for three important aspects applied to WirelessHART: channel contention based on dual slots, number of CCA slots in a shared or CSMA transaction slot, and proportion and distribution of the dedicated and shared transaction slots in a superframe. However, the invention is not just limited to WirelessHART, all of the TDMA systems that can distinguish between periodic and burst traffic can benefit from the invention.

The present teachings have the following advantageous properties:

i. It has dual slots for two kinds of traffic. In WirelessHART standard there are also two kinds of slots: dedicated slots and shared slots, but they are all transaction slots. This invention may follow this classification of transaction slots and introduces CCA slot. CCA slots are used in shared transaction slots to improve the performance of burst traffic packet contention; furthermore, the periodic traffic packet transmission in dedicated transaction slots is also improved. Because any lost periodic traffic packets in dedicated transaction slots can be re-transmitted in the following shared transaction slots, the TDMA schedule need not re-assign in next superframe. Thus the periodic data traffic is improved by a quicker re-transmission process with no extra overhead.

ii. An improved TDMA based hybrid MAC. The protocol of IEEE 802.15.4 allows a hybrid MAC protocol, which uses TDMA for periodic traffic packets, and CSMA for burst traffic packets. However, IEEE 802.15.4 is a simple hybrid of TDMA and CSMA. Superframe time is divided into two phases for TDMA and CSMA respectively, and in different phases, TDMA and CSMA are performed independently. Because CSMA can only be performed in continuous time, it cannot be used in the pure TDMA environment like WirelessHART. This invention may provide a method to apply a carrier sense scheme in a TDMA system.

iii. Dual backoff. Because the method has dual slots, the invention supports dual backoff. The first backoff is based on CCA slots. When a packet has decided to be sent in a shared transaction slot, it will delay for a random number of CCA slots to perform channel detection. The second backoff is based on shared transaction slots. When there is a packet error in a shared transaction slot, the re-transmission of the packet shall be delayed for a random number of shared transaction slots. (A new burst traffic packet can also perform this kind of delay, which will simplify the implementation and decrease the probability of packet collision.)

Alternate distribution of dedicated and shared slots. In a superframe of IEEE 802.15.4, the CSMA phase is continuous, which means the channel contentions happen intensively. There are two disadvantages of intensive contentions. Firstly, there are two kinds of packets that may contend for a channel: error packets in TDMA phase and control packets. In most cases, the error packets are more important for recovery, otherwise the TDMA schedule may be destroyed as time proceeds and that has severe consequences. Intensive contentions also makes it more difficult to distinguish between error packets and control packets. Secondly, intensive contentions degrade the performance of CSMA quickly. To solve or at least alleviate these issues the new invention may include an alternate distribution of dedicated and shared slots in time axis, which the inventors have determined, greatly improves the network performance.

As described herein, the inventive method may be applied to any of the TDMA systems capable of distinguishing periodic and burst traffic. Practising the invention in a WirelessHART wireless system requires almost no changes to the current WirelessHART wireless systems. For current wireless systems, the only change necessary when applying or practising the invention is the addition of one or more additional CCA slots within a shared transaction slot. But because CCA slot time has very short time duration relative to transaction slot time, adding several CCA slots hardly affects the current wireless system. Take WirelessHART for instance as a specific example of a TDMA protocol, increasing by at most five CCA slots (because there may be one CCA slot in current WirelessHART, thus the number of CCA slots would increase to six now) will not affect any other timers in a shared transaction slot.

vi. Backward compatibility. Because the new MAC is preferably implemented solely in a wireless node, it does not affect the original communication between nodes. So the nodes with the new MAC will be compatible with old nodes. However, the performance improvement is obvious, even when only some of the network nodes support the new MAC.

vii. Greatly improved performance for little change. Even when there are just two CCA slots in a shared transaction slot, the throughput is improved greatly. (The analyses have been made for situations in which all of the wireless nodes support the inventive protocol.) Take WirelessHART for instance; when there are two CCA slots, the theoretical peak of throughput is improved from 0.368 to 0.52. When the number of CCA slots is six, the peak throughput is improved by more than 100% (from 0.368 to 0.74).

viii. Widespread applicability. The invention is also not just limited to WirelessHART. Any of the TDMA systems capable of distinguishing periodic and burst traffic can use the invention to improve performance.

In another aspect of the present invention a wireless communication system providing wireless communication between a source node and a destination node is disclosed, wherein said wireless sensor network uses a time division multiple access (TDMA) protocol and one or more dedicated TDMA timeslots are arranged in a superframe, and wherein in said system at least one source node is arranged to transmit using a said superframe comprising at least two or more shared transaction slots.

In another aspect of the present invention a wireless node is disclosed for wireless communication in a wireless network system wherein said wireless node is arranged to operate according to a time division multiple access (TDMA) protocol in which one or more dedicated TDMA timeslots are arranged in a superframe, wherein said wireless node is arranged with a circuit and/or software to make the wireless node send a transmission wherein said superframe comprises at least two or more shared transaction slots. In particular the wireless node is arranged such that it may be configured to store and maintain variables for selecting a shared transaction slot or for calculating at least one of the following variables; Back-Off Exponent (BOExp), Back-Off Counter (BOCntr), Number of CCA slots (CCANo).

A computer program, and a computer program recorded on a computer-readable medium is disclosed in another aspect of the invention.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE INVENTION

Figure 1:
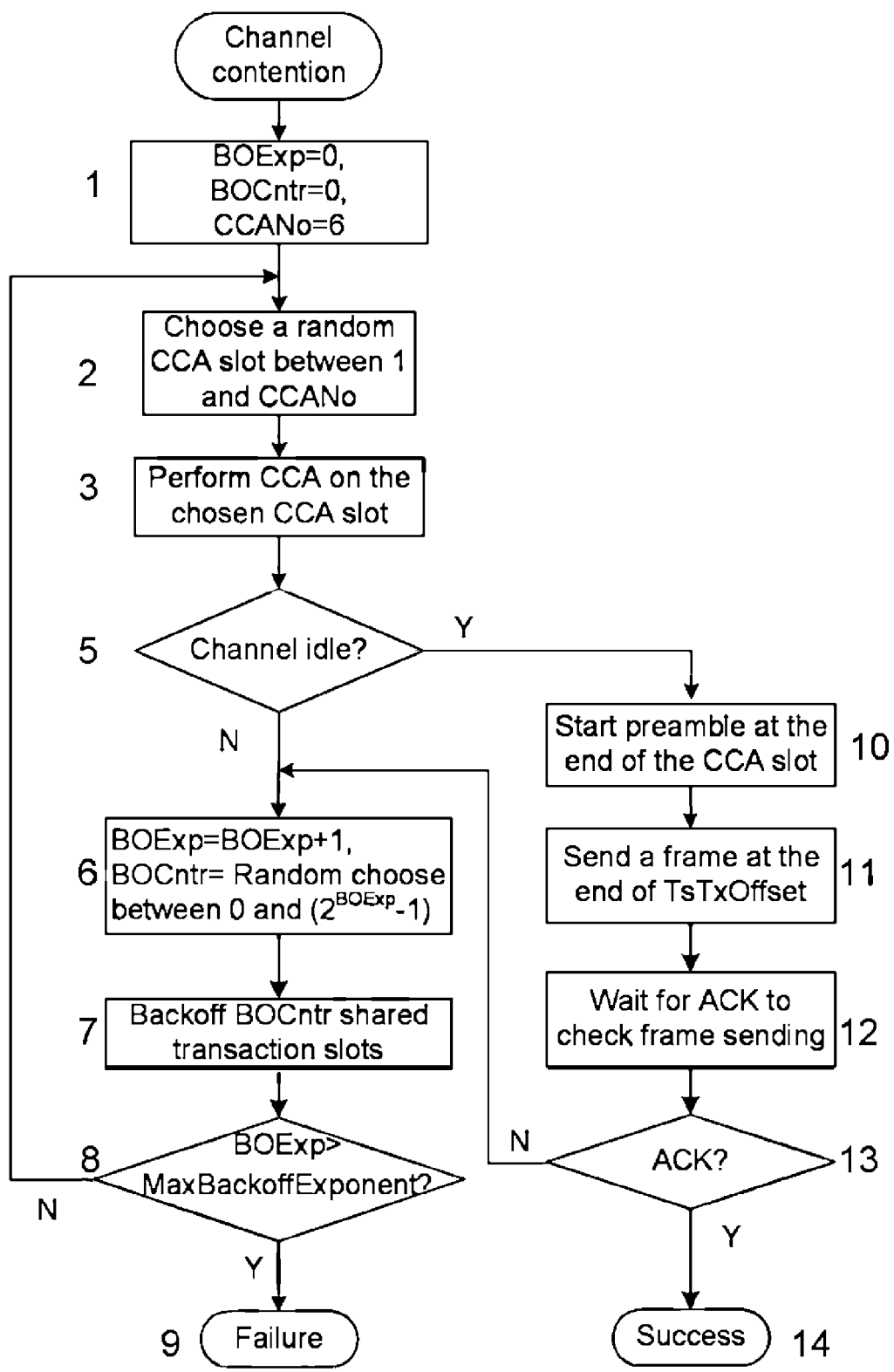
FIG. 1 shows a flowchart illustrating a method for providing wireless communication using a superframe having one or more dedicated transaction timeslots and two or more shared transaction slots according to an embodiment of the invention.

FIG. 1 shows a schematic flowchart of a channel contention method in the form of an algorithm for processing dual slots arranged in a superframe compatible with the WirelessHART protocol. The superframe comprises both dedicated transaction time slots and shared transaction time slots, hence the term dual, or even hybrid.

The figure shows a series of actions including steps 1-14 of the method. Every WirelessHART node in the wireless network when transmitting as a source node according to the inventive method maintains the following three variables:

Back-Off Exponent (BOExp),
Back-Off Counter (BOCntr) and
Number of CCA slots (CCANo).

To start with, BOExp and BOCntr are initialized to 0 (zero). CCANo equals the number of CCA slots in a shared transaction slot, and in our preferred example it is equal to 6 as seen in step 1.

When the node has a burst packet to be transmitted, it chooses a random CCA slot from 1 to CCANo, then performs the CCA channel sensing in the chosen CCA slot, step 2.

If the source node detects there are competitions (external or internal), it will randomly delay to a later shared transaction slot to transmit the packet step 6. To decide which later shared transaction slot to send in, the random back-off period is calculated based on the BOExp. The source node increases BOExp by one, and a sequential set of numbers are calculated. The set of numbers consists of the whole numbers {0, 1, ..., L} where $L=2^{BOExp}-1$. From the random back-off set of values calculated based on the BOExp, a random value for the back-off counter BOCntr is selected. For each subsequent shared transaction slot, the back-off counter BOCntr must be decremented, step 7. Only when the corresponding BOCntr value is zero can the source node attempt a transmission in a shared transaction slot.

It should be noted that the value of BOExp shall not exceed that of MaxBackoffExponent (default to 4 in WirelessHART).

On the other hand if the node detects, on performing the CCA channel sensing (step 2), that the channel is idle it immediately starts to transmit the preamble to occupy the channel after the end of its CCA slot, step 10. At the end of last CCA slot, the source node transmits its packet, and waits for the ACK (acknowledgement) from the destination node in step 12. If it receives an ACK, the transmission is successful 14; otherwise, as in steps 13->2, the source node randomly delays to a later shared transaction slot and re-transmits the packet.

The invention supports double or dual backoff as shown in FIG. 1, which is a backoff based on shared transaction slots step 6 and a backoff based on CCA slots step 2. However, when a new burst traffic packet arrives, the WirelessHART node can also perform a backoff based on shared transaction slots. This design has two advantages. Firstly, it simplifies the invention implementation, because there will be no distinction between two kinds of sending packets (new packets and re-transmission packets). Secondly, it further decreases the probability of packet collision.

Figure 2:
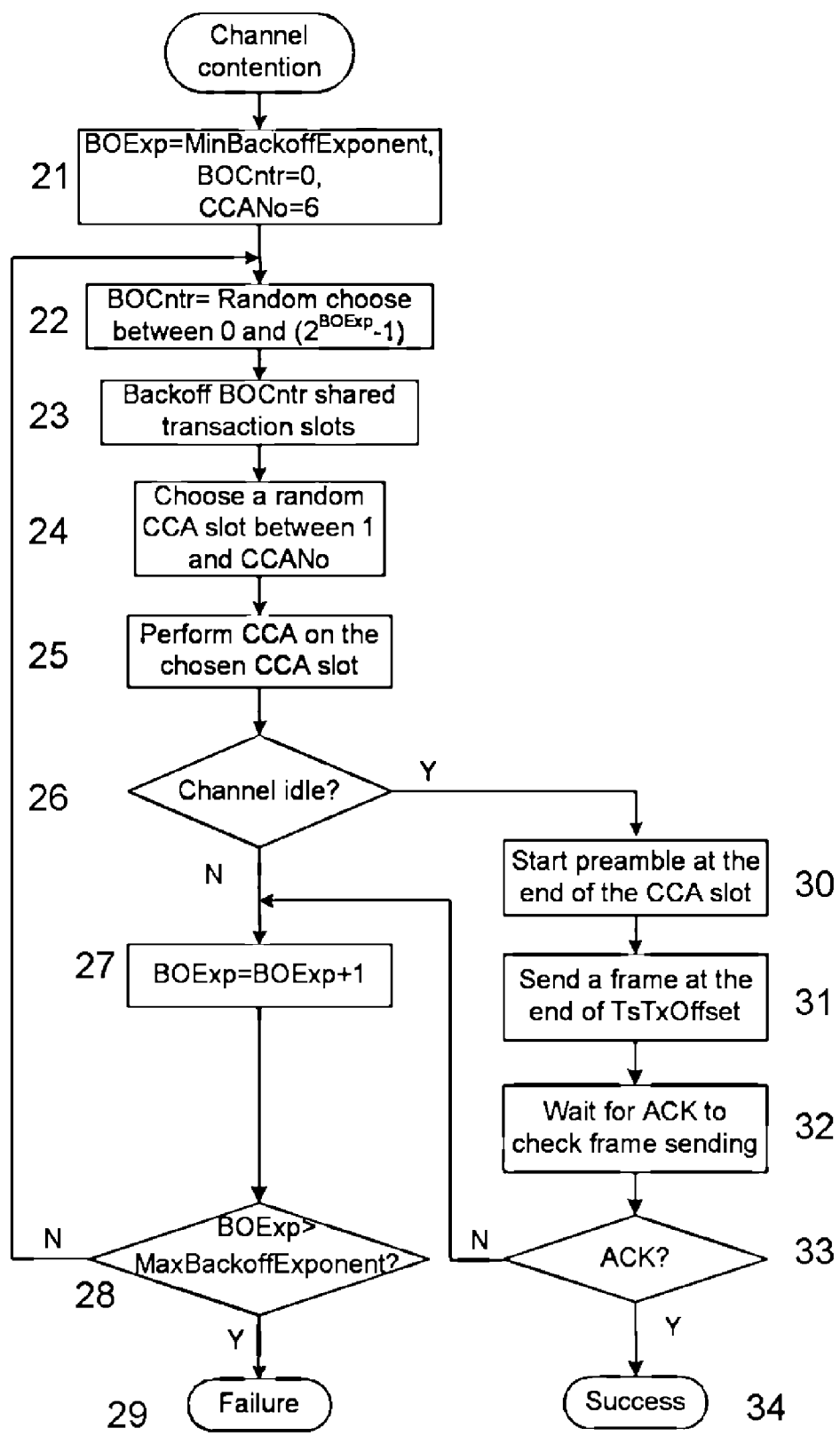
FIG. 2 shows the invention of FIG. 1 and in particular an alternative initialization of a variable used in the method.

FIG. 2 shows a flowchart with steps 21-34 for an algorithm according to another embodiment. In this embodiment the back-off exponent BOExp is not initialized to 0, but it is initialized to another value in step 21, in this example a predetermined minimum called MinBackoffExponent (a reference value is 2). Using this algorithm, the backoff based on shared transaction slots can be applied to newly arriving packets. Different from the first algorithm, a newly arriving packet delays to a random shared transaction slot based on BOCntr in step 22. In the choosing shared transaction slot step 24, the node begins to contend for the shared transaction slot as step 3 in the first algorithm. Similarly to the first algorithm, a random slot is chosen in step 24 and a channel sensing carried out 25. If the channel is not idle, then the Back-off Exponent BOEXp is incremented 27 and a random slot chosen step 22 until the maximum BOExp value is reached, step 28, at which stage the packet transmission is a failure 29. Again, similarly to the first algorithm in FIG. 1, if the channel is sensed 25 and found to be idle at step 26 then the preamble is started straight away 30 at the end of the CCA slot. The source node transmits its packet 31, and waits for the ACK (acknowledgement) from the destination node in step 32. If it receives an ACK, the transmission is successful 34; otherwise if not treats the timed out acknowledgement (TsAckWait in FIG. 3) as a channel not idle and goes to step 27 to back off BOExp and seek another random back-off time for repeating channel sensing starting at step 22.

Figure 3:
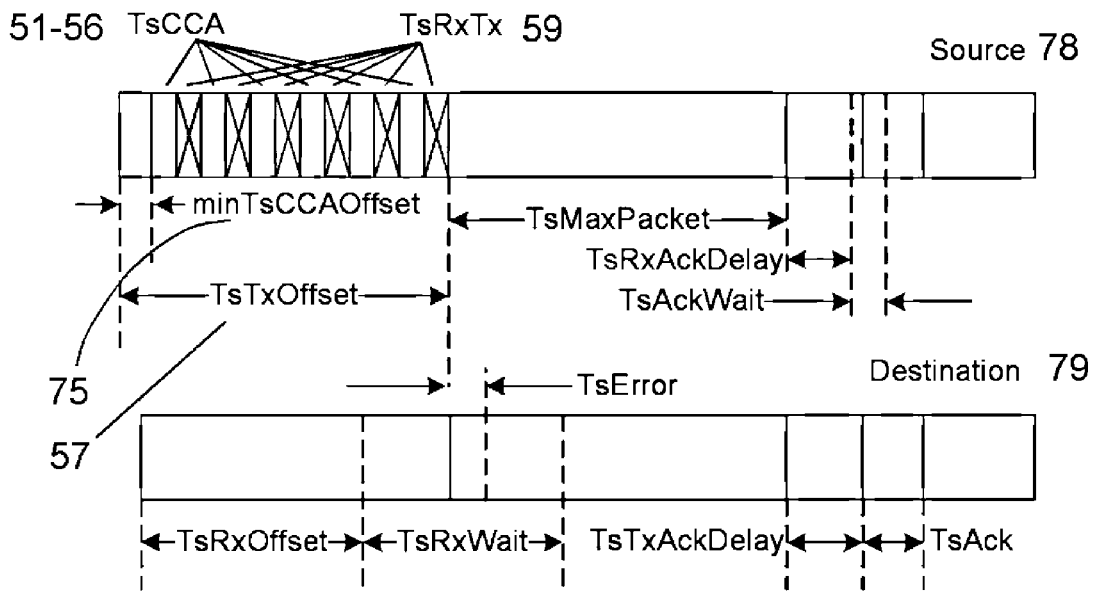
FIG. 3 shows the invention of FIG. 1 and in particular a shared transaction slot comprising two or more channel contention slots according to an embodiment of the invention of FIG. 1.

Increasing the number of CCA slots (CCANo) in the shared transaction time slot has a very important role in practicing the invention. A special case of CCANo=6 in WirelessHART is shown in FIG. 3. FIG. 3 shows one shared transaction slot 50, or shared time slot, in the superframe and provides an overview of the timings in the shared transaction slot. The upper diagram 78 shows the operation of the source node and the lower diagram 79 shows what takes place in the destination node. The upper and lower diagrams show that the 6 CCA slots in the shared time slot fit easily within the time span of the TsTxOffset.

According to WirelessHART standard, CCA detection time (channel sense time) TsCCA is 128 μs and state changing time of node from receive mode to transmit mode (TsRxTx) is 192 μs. FIG. 3 shows six TsCCA periods 51-56, and six TsRxTx periods are placed within the period min TsCCAOffset in the diagram. So the CCA slot time (CCAUnitTime) is 320 μs, which is also called CCA unit in this description. We use a CCA unit as time unit to calculate a number of CCAs that may be added into the shared slot. The reason for using CCA unit time and not just the CCA detection time is demonstrated in conjunction with FIG. 4.

Figure 4:
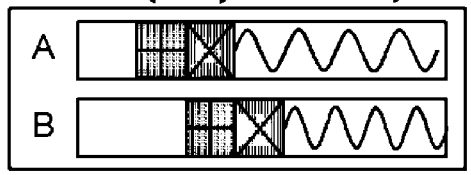
FIG. 4 shows schematically the invention of FIG. 1 and in particular a channel contention method involving the invention of FIG. 1 and further developed with an improved timeout according to an embodiment.
Figure 4:
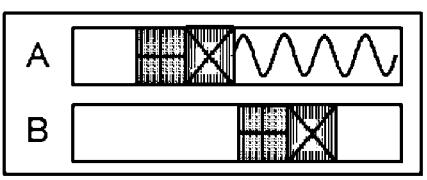

The left part 80 of the diagram in FIG. 4 shows just using CCA detection time and the right diagram part 81 shows using CCA unit time. In these two cases, we assume there are two nodes A and B which compete for the same shared slot, and Node A first performs (3, 25, FIG. 1,2) a clear channel assessment CCA 58 so detecting that the channel is idle. As shown in the left diagram 80, Node B may perform CCA after Node A's CCA. Because Node A needs a mode change time TsRxTx, 59 the receive/transmit mode change time necessary before it can start to transmit a preamble, then by the time Node B has carried out its CCA, the result is that Node B thinks the channel is idle, and a collision will then happen. Using CCA unit time (TsCCA+TsRxTx) will avoid this kind of collision as shown in the right diagram. Thus when Node B in the right side diagram 81 applies a clear channel assessment, following expiry of a complete CCA unit time period, then Node B will detect a channel contention (due to A) and not begin transmitting.

Thus without changing the underlying WirelessHART standard, we add CCA units in the duration of TsTxOffset 57 (the timing between beginning of slot and start of packet transmission, which is 2120±100 µs), so other Time-outs of TsTxOffset will not be affected.

In every transaction slot, WirelessHART nodes have to finish two things before sending a packet. Firstly, they prepare the packet being conveyed for transmission, including formatting of the packet, calculation of the MIC (message integrity code) and CRC (where CRC means cyclic redundancy check, a checksum but may be any other test for identifying unintended changes to data during communication). Secondly, the nodes may switch to a new frequency channel. These two actions can be performed in parallel. All IEEE802.15.4-compliant radio chips switch channels in less than 192 µs, and this time is also enough for the packet preparation. So 192 µs must be reserved to finish packet preparation and channel switching.

TsTxOffset in WirelessHART is 2120 µs. We reserve 192 µs at the beginning of TsTxOffset, 57, and name this time as the minimum time before CCA (minTsCCAOffset, 75). So the maximum number of CCA units (maxCCANo) that can be accommodated in the TsTxOffset can be calculated as the following formula, $$\max CCANo = [(TsTxOffset - \min TsCCAOffset)/CCAUnitTime]$$

in which
TsTxOffset is 2120 µs,
minTsCCAOffset is 192 µs, and
CCAUnitTime is 320 µs.

We can get maxCCANo=6 from the above formula, which means the maximum number of CCA slots can be 6 in the duration of TsTxOffset 57. Because we round to the nearest integer to get maxCCANo in the formula, we can refine minTsCCAOffset 75 with maxCCANo=6 as in the following formula, $$TsCCAOffset = TsTxOffset - (\max CCANo \times CCAUnitTime)$$

in which
TsTxOffset is 2120 µs,
maxCCANo is 6, and
CCAUnitTime is 320 µs.

Based on the second formula, we arrive at minTsCCAOffset=200 µs, which is the actual preparation time in TsTxOffset and more safe than 192 µs. FIG. 3 shows in a superframe the new slot Timings when there are 6 CCA units 51-56 in TsTxOffset, and the minTsCCAOffset is 200 µs. The other Time-outs of TsTxOffset are not changed.

Figure 5:
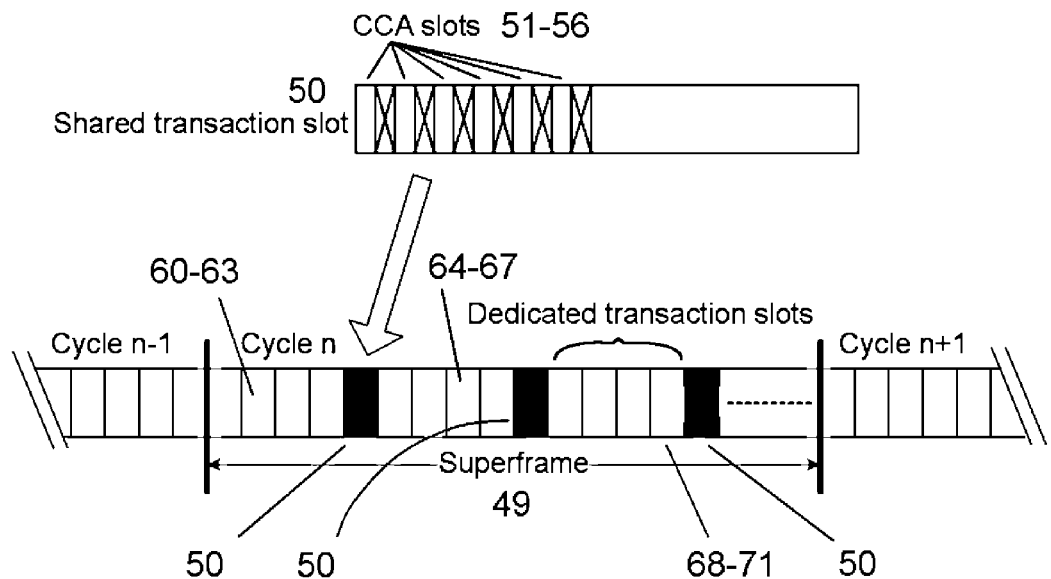
FIG. 5 shows schematically the invention of FIG. 1 and in particular a preferred distribution of dedicated transaction slots and shared transaction slots in the superframe.

According to another embodiment the proportion and distribution of dedicated and shared transaction slots in the time axis make up another important element in the invention. FIG. 5 shows Dual Slots: dedicated transaction slots 60-71 and shared transaction slots 50 containing CCA slots (51-56). The time axis is divided into superframes.

Every superframe 49 consists of many transaction slots. These transaction slots are classified into two types: dedicated transaction slots 60-71 and shared transaction slots 50. The proportion of these two kinds of transaction slots is shown as 4:1 in the ratio of dedicated to shared; which is suitable for a wireless network with average error rate 20%. FIG. 5 also shows that the distribution may be an alternate distribution of dedicated and shared transaction slots. In this exemplary example there is a pattern of four dedicated time slots, e.g. 60-63 followed by one shared transaction time slot 50. This advantageous alternate distribution cannot be implemented in a simple hybrid of TDMA and CSMA as in IEEE 802.15.4. As described above, the simple TDMA/CSMA hybrid according to IEEE 802.15.4 contains only one shared CSMA slot in a dual frame. In contrast to that, in every shared transaction slot according to this embodiment of the invention there are up to six CCA slots 51-56 which are effectively used for channel contention; and the dedicated transaction slots use TDMA protocol to exclusively pre-assign time slots to wireless users in the usual TDMA fashion.

Figure 6:
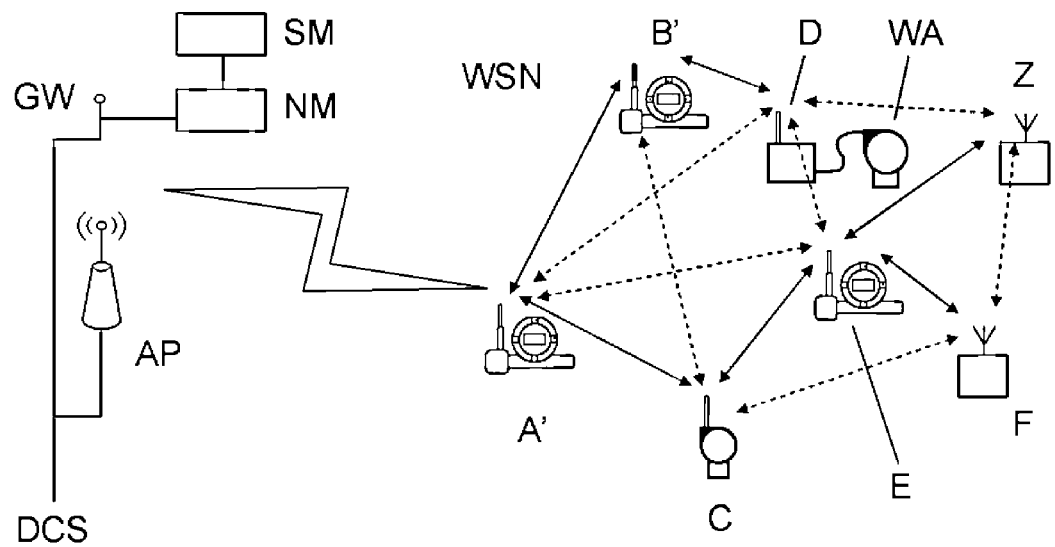
FIG. 6 is a schematic diagram for a system comprising a simple wireless network in which the invention of FIG. 1 may be applied.

FIG. 6 is a schematic diagram for a wireless system comprising a simple wireless network. The network contains a number of wireless nodes A'-Z arranged at least in part to function in a mesh network. Each wireless node has a radio transmitter/receiver which is arranged with hardware, software and firmware necessary to be able to operate compatibly with a TDMA protocol and also according to any of IEEE 802.15.4, WirelessHART, ISA 100, ZigBee. The radio chip or transceiver has an antenna, at least one processor or other circuit for processing instructions, memory storage capacity and a power supply.

Some wireless nodes A' or E may be wireless sensor nodes or wireless nodes arranged as measuring instruments. Another node D may be a sensor or instrument arranged with a wireless adapter WA. Another node C may be a portable or handheld wireless node. Other wireless nodes F-Z may be wireless nodes having different functions, functions that are unrelated to sensors or sensor networks. The network may be arranged with a gateway GW or an Access Point AP providing a data connection to a plant automation network, industrial control system or a distributed control system DCS. The gateway may be connected to a network manager NM for the wireless network. A Security manager SM may also be connected to the gateway and/or the network manager.

The invention has been described in relation to wireless networks compatible with WirelessHART standards, but may with suitable adaptation be practised with other TDMA based networks transmitting two kinds of traffic: periodic and burst.

The methods of condition monitoring as described above and elsewhere in this specification may be carried out by a computer application comprising computer program elements or software code which, when loaded in a processor or computer, causes the computer or processor to carry out the method steps. The method comprises the steps 1,2,6,10 of FIG. 1 and steps 21,24,27,30 of FIG. 2, in particular where the shared transaction slot 50 comprises two or more backoff (CCA) slots 51-56. The method steps and/or functions of the inventive wireless protocol may be carried out by processing digital functions, algorithms and/or computer programs and/or by analogue components or analogue circuits or by a combination of both digital and analogue functions.

The methods of the invention may, as previously described, be carried out by means of one or more computer programs comprising computer program code or software portions running on a computer or a processor. The microprocessor (or processors) comprises a central processing unit CPU performing the steps of the method according to one or more functions of the invention. The processor or processors may be in a wireless node A'-Z, and may also be arranged in a wireless gateway GW or in a network manager NM or other unit connected to a wireless gateway.

The computer program comprises computer program code elements or software code portions that make the computer perform the method using equations, algorithms, data, stored values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, stored on a data server or on one or more arrays of data servers. Other known and suitable media, including removable memory media such as a USB memory stick and other removable flash memories, hard drives etc. may also be used. The computer programs described may also be arranged in part as a distributed application capable of running on several different processors or computers at more or less the same time.

It should be noted that while the above describes exemplifying embodiments of the invention, there are several variations and modifications which may be made to the disclosed solution, and in particular to the number and distribution of two or more shared transaction slots in a superframe without departing from the scope of the present invention as defined in the appended claims.

References

[1] Bluetooth Special Interest Group. Bluetooth core specification v2.0. Technical report, Bluetooth SIG, November 2004.

[2] IEEE Std 802.11-2007, "Wireless LAN medium access control (MAC) and physical layer (PHY) specifications" (Revision of IEEE Std 802.11-1999).

[3] IEEE Std 802.15.4b-2006, "Wireless medium access control and physical layer specification for low rate wireless personal area networks".

[4] HART communication foundation, "TDMA Data Link Layer Specification", HCF-SPEC-075, Revision 1.1, 17 May 2008.

What is claimed is:

1. A method for providing wireless communication between a source node and a destination node in a wireless sensor network, wherein said wireless sensor network uses a time division multiple access (TDMA) protocol having a superframe, the method comprising:
transmitting, by the source node, said superframe comprising at least one dedicated transaction slot and at least two shared transaction slots, at least one of said shared transaction slots having at least two backoff CCA slots wherein when the source node has a burst packet to be transmitted, the source node chooses a random CCA slot from 1 to CCANo, performs CCA channel sensing in the chosen CCA slot, and provides dual backoff in a form of a backoff based on said shared transaction slots and a backoff based on said CCA slots if the source node detects that the channel is not idle on performing the CCA channel sensing.

2. The method according to claim 1, characterized by setting a Backoff Exponent BOExp variable in the source node to a predetermined start number wherein at least a Backoff Counter BOCntr in the source node is zeroed.

3. The method according to claim 1, characterized by selecting one shared transaction slot between 1 and $2^{BOExp}-1$ and sending the burst packet during the selected shared transaction slot if the source node detected an idle channel on performing the CCA channel sensing.

4. The method according to claim 1, characterized by checking whether a Backoff counter in the source node is equal to zero BOCntr=0 and, if so, initiating contention for the shared transaction slot.

5. The method according to claim 1, characterized by detecting receipt of an acknowledgment ACK within a predetermined time period and retransmitting the frame upon non-receipt of said acknowledgement ACK within said predetermined time period.

6. The method according to claim 1, characterized by detecting status of a channel of the randomly chosen CCA slot and starting a preamble of a transmission at an end of the randomly chosen CCA slot upon said channel of said randomly chosen CCA slot being idle.

7. The method according to claim 1, characterized by detecting status of a channel of the randomly chosen CCA slot and sending the frame at an end of a superframe offset TsTxOffset period upon said channel of said randomly chosen CCA slot being idle.

8. The method according to claim 1, characterized in that said wireless communication between said source node and said destination node comprises burst mode data transmissions.

9. The method according to claim 1, characterized in that at least one node when transmitting as the source node is arranged for storing and maintaining at least one of the following variables: Back-Off Exponent BOExp, Back-Off Counter BOCntr, Number of CCA slots CCANo.

10. The method according to claim 1, characterized in that said shared transaction slots are separated from each other by said at least one dedicated transaction slot so that said shared transaction slots are nonconsecutive.

11. A wireless network system providing wireless communication between a source node and a destination node in a wireless sensor network, wherein said wireless sensor network uses a time division multiple access (TDMA) protocol having a superframe, said system characterized in that at least one source node is arranged to transmit using said superframe comprising at least one dedicated transaction slot and at least two shared transaction slots, at least one of said shared transaction slots having at least two backoff CCA slots wherein when the at least one source node has a burst packet to be transmitted, the source node is arranged to choose a random CCA slot from 1 to CCANo, perform CCA channel sensing in the chosen CCA slot, and provide dual backoff in a form of a backoff based on said shared transaction slots and a backoff based on said CCA slots if the source node detects that the channel is not idle on performing the CCA channel sensing.

12. The system according to claim 11, characterized by wherein at least one node, when transmitting as said at least one source node, is arranged to store and maintain at least one of the following variables; Back-Off Exponent BOExp, Back-Off Counter BOCntr, Number of CCA slots CCANo.

13. The system according to claim 11, characterized wherein by said at least one dedicated transaction slot and said at least two shared transaction slots wherein the dedicated and shared transaction slots are distributed alternately such that at least one shared transaction slot is followed by a dedicated transaction slot.

14. A wireless node for wireless communication in a wireless network system comprising a source node and a destination node in a wireless sensor network, wherein said wireless node is arranged to operate according to a time division multiple access (TDMA) protocol having a superframe, said wireless node characterized by being arranged with a circuit to make the wireless node send a transmission, wherein said superframe comprises at least one dedicated transaction slot and at least two shared transaction slots, at least one of said shared transaction slots having at least two backoff CCA slots wherein when the wireless node has a burst packet to be transmitted, the wireless node chooses a random CCA slot from 1 to CCANo, performs CCA channel sensing in the chosen CCA slot, and provides dual backoff in a form of a backoff based on said shared transaction slots and a backoff based on said CCA slots if the wireless node detects that the channel is not idle on performing the CCA channel sensing.

15. The wireless node according to claim 14, characterized in that said wireless node, when transmitting as a source node, is arranged to store and maintain at least one of the following variables: Back-Off Exponent BOExp, Back-Off Counter BOCntr, Number of CCA slots CCANo.

16. A computer program product loaded into the internal memory of a computer or processor arranged to perform, when said product is executed, a method for providing wireless communication between the source node and a destination node in-a the wireless sensor network, wherein said wireless sensor network uses a time division multiple access (TDMA) protocol having a superframe, the method comprising:

transmitting, by the source node, said superframe comprising at least one dedicated transaction slot and at least two shared transaction slots, at least one of said shared transaction slots having at least two backoff CCA slots wherein when the source node has a burst packet to be transmitted, the source node chooses a random CCA slot from 1 to CCANo, performs the CCA channel sensing in the chosen CCA slot, and provides dual backoff in a form of a backoff based on said shared transaction slots and a backoff based on said CCA slots if the source node detects that the channel is not idle on performing the CCA channel sensing.

\* \* \* \* \*